US006062498A

United States Patent [19]

Klopfer

[11] Patent Number: 6,062,498

[45] Date of Patent: May 16, 2000

[54] FUEL INJECTOR WITH AT LEAST ONE MOVABLE NEEDLE-GUIDE

[75] Inventor: Kenneth H. Klopfer, Eart Hartland, Conn.

[73] Assignee: Stanadyne Automotive Corp., Winsdor, Conn.

[21] Appl. No.: 09/067,299

[22] Filed: Apr. 27, 1998

[51] Int. Cl.$^{7}$ .................................................... G01M 15/00

[52] U.S. Cl. .................................. 239/533.2; 239/533.11; 200/83 Q; 123/494

[58] Field of Search ............................ 239/533.2, 533.11; 200/83 Q; 123/494

[56] References Cited

U.S. PATENT DOCUMENTS

| | | | |
|---|---|---|---|
| 2,750,957 | 6/1956 | Tavola | 239/533.11 |
| 3,667,684 | 6/1972 | Baumgart | 239/533.11 |
| 4,066,059 | 1/1978 | Mayer et al. | 123/32 SA |
| 4,181,010 | 1/1980 | Knape et al. | 200/82 D |
| 4,335,601 | 6/1982 | Buck et al. | 200/83 Q |
| 4,414,845 | 11/1983 | Hofmann | 200/83 Q |
| 5,110,054 | 5/1992 | Stevens | 239/533.11 |

*Primary Examiner*—David Deal
*Attorney, Agent, or Firm*—Alix, Yale & Ristas, LLP

[57] ABSTRACT

A fuel injector having a needle valve and an injector body employs at least one movable needle-guide which having a plurality of movable members disposed between the needle valve assembly and the injector body. The movable members can be insulating members which are substantially entirely composed of insulating material such as ceramics. In applications which do not require electrical isolation, the movable members could be formed of conductive material. The movable members are preferably spherical elements which are partially cradled within an annular trough formed in the needle valve such that the movable members ensure that the needle valve is held in spaced relation to the injector body. While the movable members are preferably formed as solid ceramic spheres, other insulating materials and/or shapes could be utilized.

20 Claims, 2 Drawing Sheets

FUEL INJECTOR WITH AT LEAST ONE MOVABLE NEEDLE-GUIDE

BACKGROUND OF THE INVENTION

1. Field of the Invention

The present invention generally relates to fluid injectors for delivering high pressure fluid in a controlled manner. More particularly, the invention relates to an improved fuel injector for supplying fuel to an internal combustion engine, the injector utilizing at least one needleguide. Accordingly, the general objects of the present invention are to provide novel and improved methods and apparatus of such character.

2. Description of the Related Art

Fuel injection nozzles for supplying fuel to internal combustion engines are well known in the art. Such injectors typically employ an injector body which is affixed to an internal combustion engine such that a nozzle end thereof extends into an engine cylinder. The injector body defines an interior cavity which is fluidly connected with a fuel supply and a needle valve cooperates with the injector body to selectively permit fluid received from the fuel supply to pass through the interior cavity of the injector body and into the engine cylinder. Most internal combustion engines employ a plurality of cylinders and it is common to employ one or more of such injectors with each engine cylinder. Recent developments have focused on supplying fuel to these multiple injectors from a common fuel-supply rail and on controlling the injectors with a centralized microprocessor.

One type of injector described above is shown in FIG. 1, the injector being shown in the non-injection phase of the injection cycle. The common rail injector 10 of FIG. 1 employs a hydraulic force imbalance scheme wherein a power piston 12, disposed at one end of a needle valve assembly 14, cooperates with other components to control the net system forces acting upon the needle valve assembly 14. In the design shown, a control chamber 16 which lies adjacent one end of the power piston 12 contains a volume of high-pressure fuel during the non-injection phase of the injection cycle. The force of this high-pressure fuel acts downwardly on the power piston 12 to urge an opposite end of the needle valve 14 to sealingly engage with an apertured nozzle 22 of an injector body 24. In this state, the fuel supplied to the injector 10 is not permitted to pass into the engine cylinder. However, the pressure within the control chamber 16 can be relieved by energizing an actuator 30 to move a valve 26 and open a spill path 28 from the control chamber 16 to low pressure return 27 thereby decreasing the pressure in the control chamber 16. When the pressure within the control chamber 16 drops to a predetermined level, the needle valve 14 moves upwardly to permit fuel to flow through the injector body cavity 15, through apertured nozzle 22 and into the engine cylinder. De-energizing the solenoid actuator 30 closes the fuel spill path 28. The pressure within the control chamber 16 then increases until it overcomes the upward force acting on the needle valve 14 and needle valve 14 is again urged into its initial position. With the fuel injection cycle thus completed, it can be repeated as desired.

It should be appreciated that the injector of FIG. 1 is normally connected to a microprocessor for controlling actuation of actuator 30 in order to achieve the desired beginning of injection (BOI) and end of injection (EOI) events. In order to provide a feedback mechanism for the injector/microprocessor system, the combination of the electrically-conductive needle valve assembly 14 and the electrically-conductive injector body 24 are used as contacts of an electrical switch which operates as described below. Needle valve assembly 14 is supported within injector body 24 at upper insulating guide 17 and at lower insulating guide 20. Valve assembly 14 is normally urged into contact with apertured nozzle 22 of injector body 24, thus, closing the electrical circuit. An insulating button 18 is located between the upper portion of needle valve 14 and power piston 12 to prevent electrical conduction therebetween. Therefore, needle valve 14 only makes metal-to-metal contact at apertured nozzle 22 and at a compression spring 23. The upper end of spring 33 is supported by an insulated washer and is connected to a BOI/EOI output wire schematically represented at 25. When needle valve 14 physically contacts body 24, a closed electrical circuit is formed between output wire 25 and nozzle body 24. When valve needle 14 moves away from apertured nozzle 22, the electrical circuit is broken. Thus, opening and closing needle valve 14 opens and closes the electrical circuit which signals the beginning and end of injection (BOI/EOI).

Upper and lower insulating guides 17 and 20 are of a conventional nature. These insulating guides can be formed by coating either or both of needle valve assembly 14 and injector body 24 with some wear-resistant insulating material such as diamond-like carbon (DLC) or aluminum oxide. Additional methods of forming upper and lower insulating guides 17 and 20 are disclosed in U.S. Pat. No. 4,066,059 to Mayer et al granted Jan. 3, 1978 and U.S. Pat. No. 4,414,845 to Hofmann granted Nov. 15, 1983. The contents of these patents are hereby incorporated by reference.

While injectors of the type shown in FIG. 1 are effective for their intended purpose, such injectors suffer from a number of deficiencies directly associated with the nature of conventional insulating guides 17 and 20. First, insulating guides 17 and 20 are prone to excessive wear during long-term use due to the relative movement between needle valve assembly 14 and injector body 24 during injector cycling. This is particularly true when insulating guides 17 and 20 are formed by directly coating either or both of needle valve assembly 14 and/or injector body 24 with an insulating material. A second deficiency is that coating selected portions of needle valve assembly 14 and/or body 24 with insulating materials can add unnecessary expense to the cost of an injector. Similarly, where insulating guides 17 and/or 20 are formed using insulated inserts, injector assembly costs can add additional costs. A third deficiency associated with conventional injectors resides in the need for high quality control standards associated with manufacturing and utilizing conventional insulating guides. In particular, high quality control standards must be applied in utilizing conventional insulating guides 17 and 20 because even a small defect in an insulating guide can cause failure of a fuel injector. Such a failure could either occur due to initial manufacturing defects or due to long term wear on the insulating guide. Yet another deficiency associated with injectors utilizing some conventional insulating guides is that they do not permit the flow of fuel between needle valve assembly 14 and body 24 in the region of the guide. While this characteristic may be desired in some instances, it impedes performance of the injector in other instances.

SUMMARY OF THE INVENTION

Accordingly, it is an object of the present invention to provide a fuel injector utilizing at least one movable needle-guide to improve wear characteristics of the injector.

It is a further object of the present invention to provide an improved fuel injector having an insulating needle-guide which utilizes rotational motion to guide the needle valve during movement.

It is another object of the present invention to provide an improved fuel injector which offers improved long-term wear characteristics.

It is still another object of the present invention to provide an improved fuel injector which utilizes at least one ceramic insulating needle-guide.

It is yet another object of the present invention to provide an improved fuel injector which requires less stringent quality control standards during the manufacturing thereof and yet still results in a high quality fuel injector at minimum cost.

It is an additional object of the present invention to provide an improved fuel injector utilizing at least one insulating needle-guide which permits fuel to freely pass between the needle valve assembly and injector body in the region of the insulating needle-guide.

It is still another object of the present invention to provide an improved fuel injector which offers an optimal combination of injector (1) simplicity; (2) reliability; (3) efficiency; and (4) versatility.

These and other objects and advantages of the present invention are provided in one embodiment by providing a fuel injector of the general nature discussed above which employs at least one movable needle-guide which employs a plurality of movable members disposed between the needle valve assembly and the injector body. The movable members are preferably insulating members and are preferably substantially entirely composed of insulating material. However, the preferred movable members could be coated with an insulating material whether or not an internal core thereof is formed of an insulating material. Furthermore, in applications which do not require electrical isolation, the movable members could even be formed of electronically-conductive material. In some of the embodiments of the present invention, the plurality of movable members are discrete members disposed around the circumference of an annular trough formed in the needle valve assembly such that the members ensure that the needle valve assembly is held in spaced relation to the injector body. An opposite arrangement, however, wherein a trough-like structure for cradling the movable members is formed in the injector body, could also be utilized.

While the movable members are preferably formed as solid ceramic spheres, other insulating materials and/or shapes could be utilized. For example, where the needle valve assembly and injector body present complimentary square surfaces, cylindrical movable members could be utilized. Such an arrangement could be tailored to prevent fuel flow between the needle valve assembly and the injector body. Where fuel passage is desired, however, spherical movable members, for example, could be utilized to form fuel passages between adjacent movable members, the needle valve and the injector body.

Numerous other advantages and features of the present invention will become apparent to those of ordinary skill in the art from the following detailed description of the invention, from the claims and from the accompanying drawings.

BRIEF DESCRIPTION OF THE DRAWINGS

The preferred embodiments of the present invention will be described below with reference to the accompanying drawings wherein like numerals represent like structures and wherein.

DESCRIPTION OF THE PREFERRED EMBODIMENT

Figure 1:
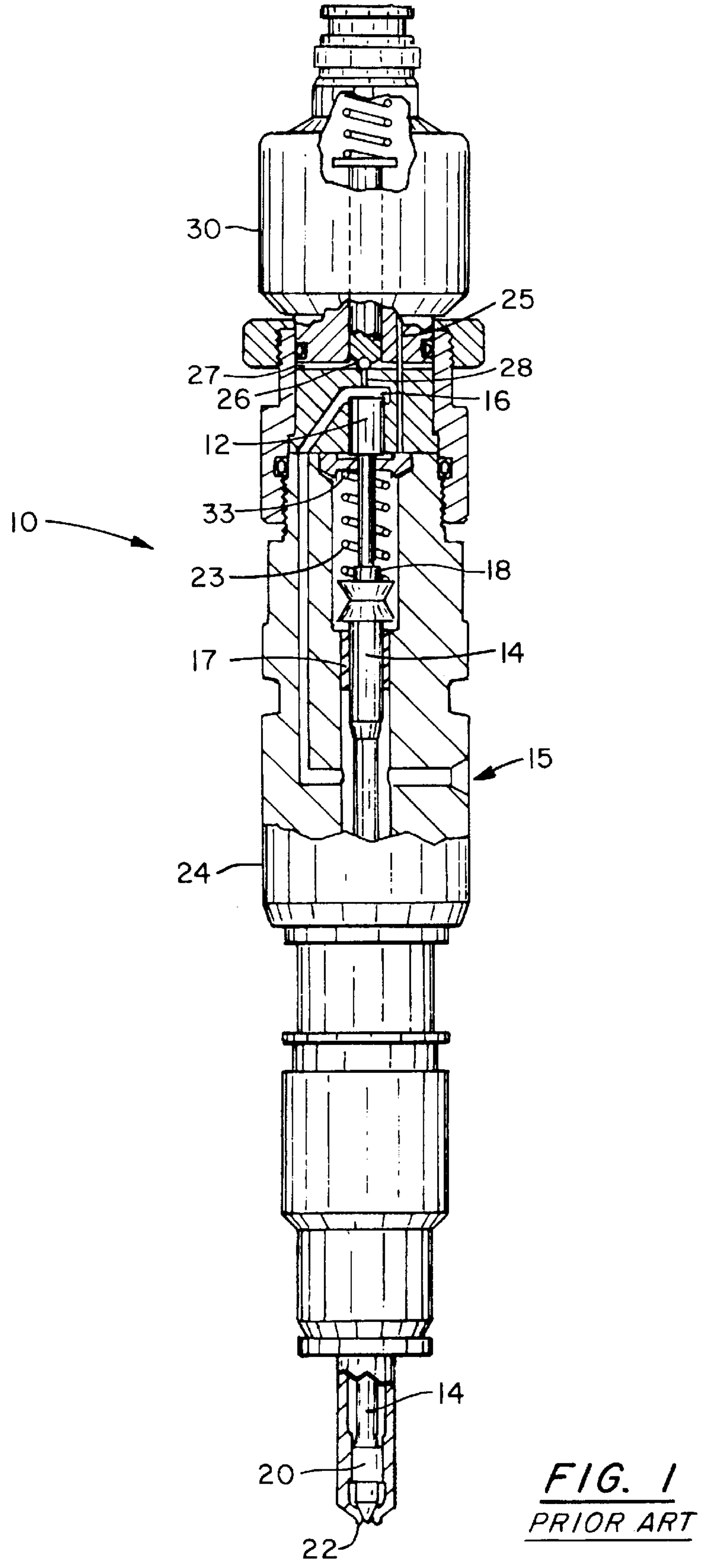
FIG. 1 PRIOR ART
FIG. 1 is a cross-sectional elevation view of a common rail injector of the related art.

The preferred embodiment of the injector according to the invention will be described with joint reference to FIGS. 2 and 3 and is of the same general nature as the related art fuel injector of FIG. 1. Those of ordinary skill in the art will readily appreciate that the injector 10' of FIGS. 2 and 3 incorporates the present invention into an electronically controlled common-rail type fuel injector for use with a diesel engine. However, it will also be appreciated that the instant invention can be incorporated into a wide variety of other styles of known fuel injectors.

Figure 2:
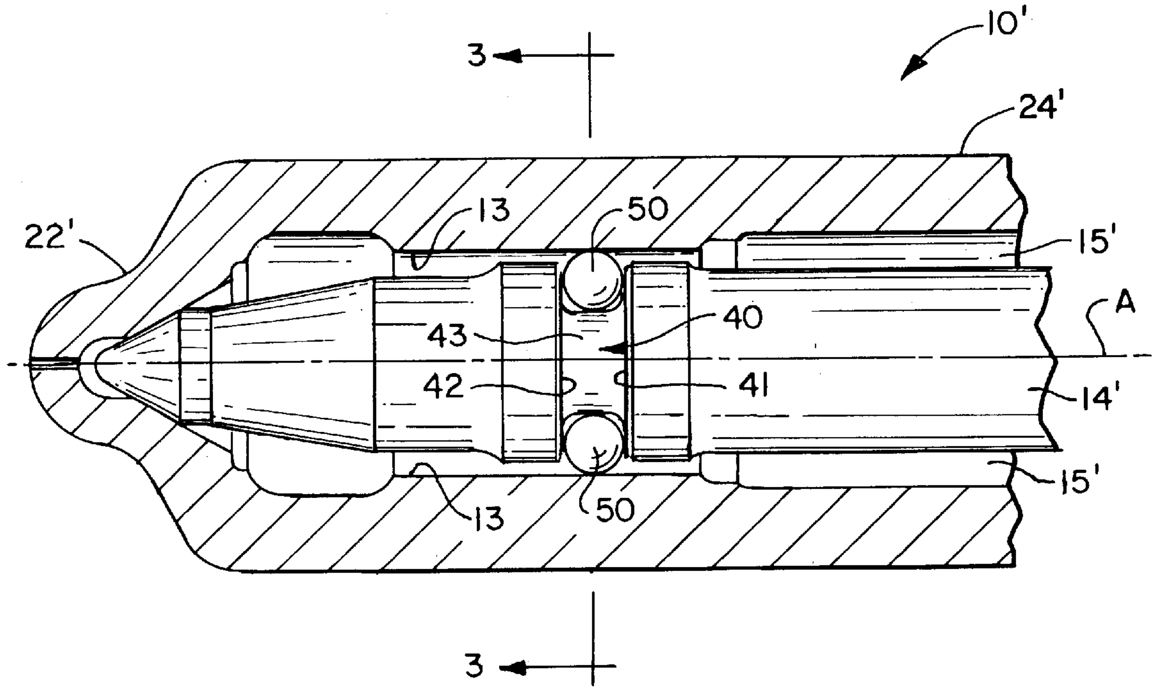
FIG. 2 is a cross-sectional elevation view of a portion of the preferred embodiment of the fuel injector of the present invention, FIG. 2 showing an inventive insulating needle-guide utilized near the tip of the needle valve assembly.
Figure 3:
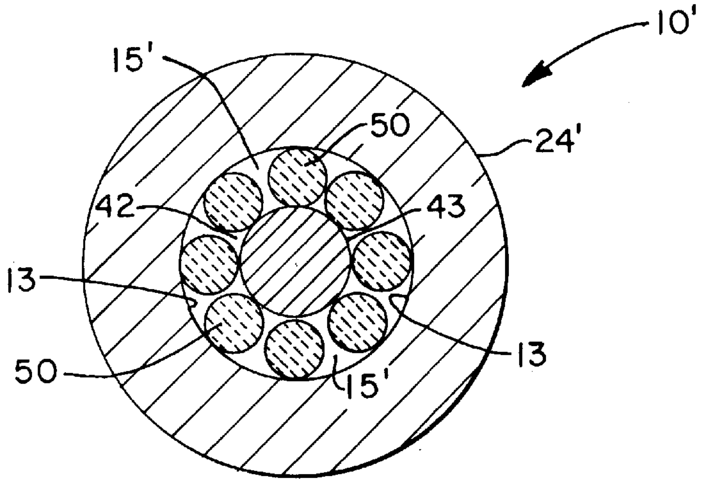
FIG. 3 is a cross-sectional view of the inventive fuel injector depicted in FIG. 2, the section being taken along line 3—3.

The injector 10' of FIGS. 2 and 3 has an injector body 24' which includes an apertured nozzle 22' at one end thereof and a movable member bearing-surface 13 within an interior cavity 15' of injector body 24'. The injector 10' further comprises a movable needle valve assembly 14' disposed within the interior cavity 15' of injector body 24' for linear reciprocal movement between fuel-blocking and fuel-injection positions. The portion of interior cavity 15' which is not occupied by needle assembly 14' contains high pressure fuel from a common rail fuel supply as is conventional in the art. Needle assembly 14' also preferably includes an annular trough 40 which is disposed opposite bearing surface 13 of body 24'. Trough 40, thus, includes a cylindrical surface 43 and first and second opposing hollow circular surfaces 41 and 42, respectively. Surfaces 41 through 43 of trough 40 provide movable-member bearing surfaces on needle assembly 14' and cradle movable members 50 therein. As best shown in FIG. 2, needle assembly 14' is preferably symmetric with respect to axis A.

Injector 10' further comprises at least one inventive needle-guide which preferably includes a plurality of movable insulating guide members 50 not integral with (i.e., not fixedly attached to) either body 24' or needle valve 14'. Thus, movable members 50 typically experience rotational motion relative to needle valve 14 and rotational and longitudinal motion relative to body 24' during longitudinal movement of needle valve 14'. As shown, movable members 50 are preferably spherical in shape. As shown, movable members 50 are disposed between needle valve assembly 14' and injector body 24' such that needle valve assembly 14' is held in spaced relation to injector body 24' and such that fuel is free to pass through cavity 15' between injector body 24', needle valve assembly 14' and movable members 50.

While movable members 50 are preferably formed of discrete, solid spherical ceramic balls, a number of alternatives will be readily apparent to those of ordinary skill in the art. For example, movable members 50 could be composed of a metallic core with a ceramic coating on the surface thereof. Also, members 50 could be composed of a conductive core, such as a metallic core, with a coating of some other insulating material on the surface thereof. For example, this insulating material could be diamond-like carbon (DLC), aluminum oxide or other similar materials known in the art. Additionally, members 50 could be composed of solid ceramic balls with an additional layer of insulating and/or friction-reducing materials for still further improved performance.

The geometry of the various components discussed above could also be altered without departing from the spirit and scope of the invention. For example, members 50 could include solid cylindrical movable members rather than spherical members. In such a case, annular trough 40 would preferably be changed to a hollow-square style trough. Alternatively, trough 40 could take the form of a plurality of smaller discrete member-retaining troughs, each of which would retain at least one insulating member 50. In either case, however, the shape of bearing surface 13 would be changed to cooperate with members 50 accordingly (e.g., surface 13 could have planar bearing surfaces). Similarly, the movable member trough could be formed in injector body 24' and a complimentary bearing surface could be provided on needle assembly 14'. Finally, even if spherical members 50 are employed, annular trough 40 could be replaced by a plurality of discrete member-retaining troughs for retaining one or more of members 50. Also, discrete guide-slots which extend parallel to axis A could be cut into bearing surface 13 in order to further guide the movement of members 50.

While the preferred embodiment of the present invention has been shown as a guide member which can be utilized near the tip of an injector, those of ordinary skill will readily appreciate that the inventive insulating guide could also be utilized in other locations along the length of needle assembly 14'. Additionally, it should be appreciated that, in applications requiring more than one needle-guide member, one or more of the inventive needle-guides could be combined with one or more of the conventional needle-guides discussed above.

While the present invention has been described in connection with what is presently considered to be the most practical and preferred embodiments, it is to be understood that the present invention is not limited to the disclosed embodiments. Rather, it is intended to cover all of the various modifications and equivalent arrangements included within the spirit and scope of the appended claims.

What is claimed is:

1. A fuel injector of the type used to inject fuel into a cylinder of an internal combustion engine when installed therein, said injector comprising:

an electrically-conductive injector body which defines an interior cavity and an apertured nozzle region fluidly connected with the engine cylinder when said injector is installed in the engine;

an electrically-conductive needle valve assembly at least partially disposed within said interior cavity for movement between first and second positions, said needle blocking fuel flow through said nozzle region when said needle is in said first position and said needle permitting fuel flow through said nozzle region when said needle is in said second position; and at least one movable electrically-insulating needle-guide disposed between said needle and said injector body, said needle-guide limiting movement of said needle relative to said injector body such that said needle and said body form a closed electrical circuit when said needle is in said first position and such that said needle and said body form an open electrical circuit when said needle is in said second position.

2. The fuel injector of claim 1, wherein said needle-guide comprises a plurality of movable members.

3. The fuel injector of claim 2, wherein said movable members are comprised substantially entirely of electrically-insulating material.

4. The fuel injector of claim 2, wherein said movable members are coated with electrically-insulating material.

5. The fuel injector of claim 4, wherein each of said movable members is at least substantially spherical.

6. The fuel injector of claim 2, wherein each of said movable members is at least substantially spherical.

7. The fuel injector of claim 2, wherein said movable members are ceramic.

8. The fuel injector of claim 1, wherein said needle valve assembly includes at least one movable-member receiving-trough;

said injector body includes at least one bearing surface disposed within said interior cavity and oppositely of said at least one trough; and said needle-guide comprises a plurality of movable members at least partially cradled within said at least one trough.

9. The fuel injector of claim 1, wherein said needle-guide permits fuel flow through said interior cavity and between said needle-guide, said needle valve assembly and said injector body.

10. The fuel injector of claim 1, wherein said needle-guide comprises a plurality of movable members which rotate relative to said injector body as said needle valve assembly moves between said first and second positions.

11. A fuel injector of the type used to inject fuel into a cylinder of an internal combustion engine when installed therein, the engine having a high-pressure fuel supply which delivers fuel to said injector and a low-pressure fuel return which removes fuel from said injector, said injector comprising:

an injector body which defines an axis, an interior cavity and an apertured nozzle region fluidly connected with the engine cylinder when said injector is installed in the engine;

a needle valve assembly at least partially disposed within said interior cavity for movement between first and second positions, said needle blocking fuel flow through said nozzle region when said needle is in said first position and said needle permitting fuel flow through said nozzle region when said needle is in said second position;

at least one movable needle-guide comprised of a plurality of discrete members disposed between said needle and said injector body, said discrete members permitting only substantially axial movement of said needle; and wherein said injector body and said needle valve assembly are electrically-conductive; and said discrete members are electrically-insulating.

12. The fuel injector of claim 11, wherein said discrete members are substantially entirely ceramic.

13. The fuel injector of claim 11, wherein said discrete members rotate relative to said injector body and said needle valve assembly as said needle valve assembly moves between said first and second positions.

14. The fuel injector of claim 11, wherein said injector body further comprises at least one movable-member bearing-surface which contacts at least one of said discrete members.

15. A fuel injector of the type used to inject fuel into a cylinder of an internal combustion engine when installed therein, the engine having a high-pressure fuel supply which delivers fuel to said injector and a low-pressure fuel return which removes fuel from said injector, said injector comprising:

an injector body which defines an axis, an interior cavity and an apertured nozzle region fluidly connected with the engine cylinder when said injector is installed in the engine;

a needle valve assembly at least partially disposed within said interior cavity for movement between first and second positions, said needle blocking fuel flow through said nozzle region when said needle is in said first position and said needle permitting fuel flow through said nozzle region when said needle is in said second position;

at least one movable needle-guide comprised of a plurality of discrete members disposed between said needle and said injector body, said discrete members permitting only substantially axial movement of said needle; and wherein said discrete members are spherical and are at least partially comprised of a material selected from the group consisting of ceramics, diamond-like carbon and aluminum oxide.

16. The fuel injector of claim 15 wherein said injector body and said needle valve assembly are electrically-conductive; and said discrete members are electrically-insulating.

17. A fuel injector of the type used to inject fuel into a cylinder of an internal combustion engine when installed therein, said injector comprising:

an injector body which defines an axis, an interior cavity and an apertured nozzle region fluidly connected between the high-pressure fuel supply and the engine cylinder when said injector is installed in the engine;

a needle valve assembly at least partially disposed within said injector for reciprocal movement along said axis between a first and second position wherein said needle blocks fuel flow into the engine cylinder and a second position wherein said needle does not block fuel flow into the engine cylinder; and means for electrically isolating said needle from said body when said needle is in said second position.

18. The fuel injector of claim 17, wherein said means for electrically isolating said needle comprises a plurality of ceramic spheres disposed about said needle valve assembly to maintain said needle valve assembly in spaced relation to said injector body when said needle valve assembly is in said second position.

19. The fuel injector of claim 17, wherein said means for electrically isolating said needle comprises a plurality of electrically-insulating movable members.

20. The fuel injector of claim 19, wherein said needle valve assembly further comprises an annular trough disposed about said axis for partially cradling said movable members;

said injector body further comprises at least one bearing surface disposed within said interior cavity and oppositely of said trough; and said movable members rotate against said bearing surface as said needle valve assembly moves between said first and second positions.

* * * * *